No. 670,476. Patented Mar. 26, 1901.
J. B. ENTZ.
ELECTRICAL DISTRIBUTION.
(Application filed Sept. 1, 1900.)
(No Model.)
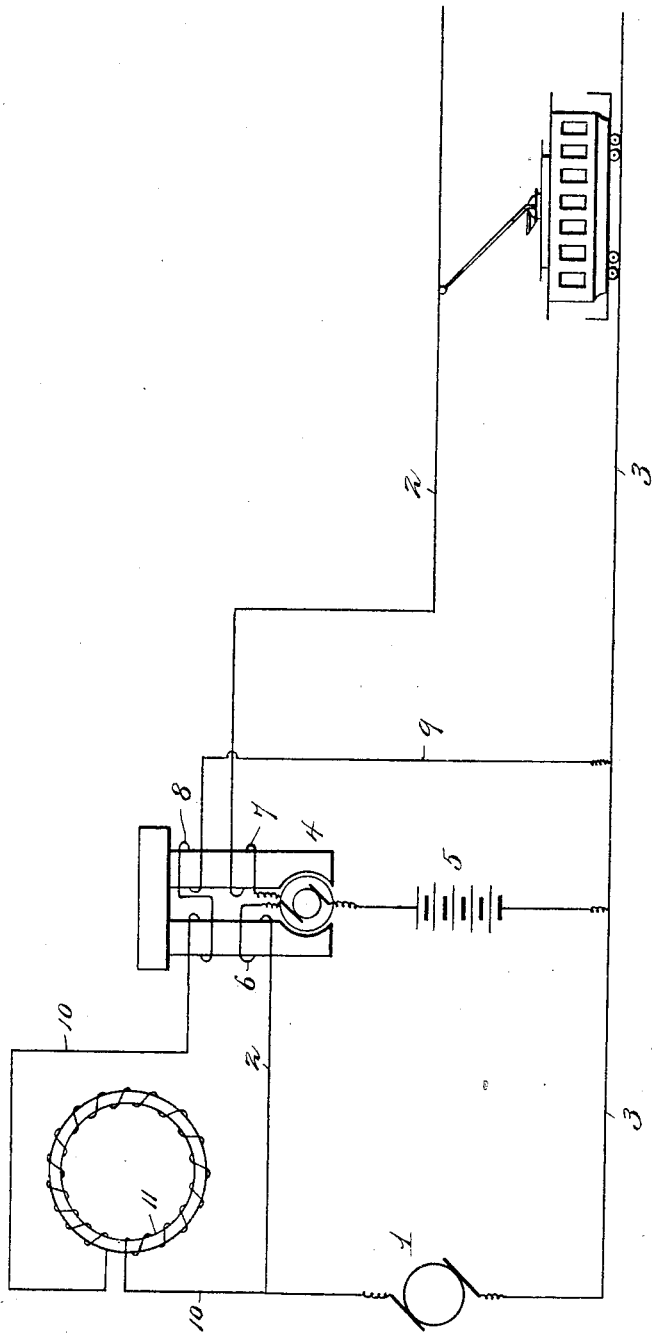
Witnesses:
Inventor.
Justus B. Entz.
By Augustus B. Stoughton
Attorney

United States Patent Office.

JUSTUS B. ENTZ, OF PHILADELPHIA, PENNSYLVANIA, ASSIGNOR TO THE ELECTRIC STORAGE BATTERY COMPANY, OF SAME PLACE.

ELECTRICAL DISTRIBUTION.

SPECIFICATION forming part of Letters Patent No. 670,476, dated March 26, 1901.

Application filed September 1, 1900. Serial No. 28,813. (No model.)

*To all whom it may concern:*

Be it known that I, JUSTUS B. ENTZ, a citizen of the United States, residing at the city of Philadelphia, in the county of Philadelphia and State of Pennsylvania, have invented certain new and useful Improvements in Electrical Distribution, of which the following is a specification.

Dynamo-electric machines designated "boosters" are employed to automatically change voltage, in connection with many installations of which storage batteries form a part. The general purpose of such machines is to cause the battery to discharge and coöperate with the main generator or generators during periods of more than average load and to charge during periods of less than average load and to neither charge nor discharge during periods of average load which the main generator or generators is or are designed to carry.

One object of the present invention is to make the booster act promptly and to increase the efficiency of the regulation.

Other objects of the invention, as well as the invention itself, are hereinafter described, and pointed out in the claims.

The nature, characteristic features, and scope of my invention will be more fully understood from the following description, taken in connection with the accompanying drawing, forming part hereof, and in which I have illustrated diagrammatically a system of distribution embodying features of the invention.

In the drawing, 1 is a generator or group of generators designed to carry the average load on the working circuit 2 3.

4 is a booster for causing the battery 5 to charge during periods of less than average load on the circuit 2 3 and to discharge during periods of more than average load on the circuit 2 3. For this purpose it may be provided with series field-coils, of which 6 and 7 are an example. The described action of the booster may be accomplished automatically, for which purpose it is customary to provide it with a separately excited or shunted field-coil, of which 8 is an example. The described arrangement is all known in the art and is in satisfactory operation. However, I will first point out one of its inherent defects or limitations and will then describe means embodying my invention by which such defects and limitations are obviated. A change in the circuit 2 3 due to a departure from the average load tends to produce in the circuit of the coil 8 a change of current opposing the magnetizing effect desired to be produced in the field of the booster, and this delayed the regulation sought to be accomplished.

According to my invention I place in the circuit (marked on the drawing 9 10) of the coil 8 an impedance-coil 11. This coil 11 constitutes a resistance of high self-induction and also tends to resist change of current in the circuit 9 10, and therefore its presence obviates the defects hereinabove mentioned.

It will be obvious to those skilled in the art to which my invention appertains that modifications may be made in details without departing from the spirit thereof. Hence I do not limit myself to the precise construction and arrangement of parts hereinabove set forth, and illustrated in the accompanying drawing; but,

Having thus described the nature and objects of my invention, what I claim as new, and desire to secure by Letters Patent, is—

1. In a system of electrical distribution the combination with the shunt field-circuit of a booster of a resistance of high self-induction interposed in said circuit, substantially as described.

2. In a system of electrical distribution the combination of a booster having field-coils, a shunt field-coil for the booster which acts as a secondary to the first-mentioned field-coils, and an impedance-coil in series relation to said shunt-coil to diminish currents which would be induced by the action of the first-mentioned field-coils.

3. In a system of electrical distribution the combination with the shunt field-circuit of a booster of an impedance-coil, substantially as described.

In testimony whereof I have hereunto signed my name.

JUSTUS B. ENTZ.

In presence of—
K. M. GILLIGAN,
W. J. JACKSON.